United States Patent [19]

Hara et al.

[11] Patent Number: 4,718,035

[45] Date of Patent: Jan. 5, 1988

[54] LOGIC OPERATION CIRCUIT HAVING AN EXCLUSIVE-OR CIRCUIT

[75] Inventors: Hiroyuki Hara, Tokyo; Yasuhiro Sugimoto, Yokohama, both of Japan

[73] Assignee: Kabushiki Kaisha Toshiba, Kawasaki, Japan

[21] Appl. No.: 734,078

[22] Filed: May 15, 1985

[30] Foreign Application Priority Data

May 24, 1984 [JP] Japan ................... 59-105116

[51] Int. Cl.⁴ .................. G06F 7/50; H03K 19/21
[52] U.S. Cl. ..................... 364/784; 307/471
[58] Field of Search ............... 307/471, 472; 364/768, 364/784–788

[56] References Cited

U.S. PATENT DOCUMENTS

| | | | |
|---|---|---|---|
| 3,519,810 | 7/1970 | Priel et al. | 364/784 |
| 3,590,230 | 6/1971 | Nordquist | 364/784 |
| 3,612,847 | 10/1971 | Jörgensen | 364/786 |
| 4,215,418 | 7/1980 | Muramatsu | 364/784 |
| 4,408,134 | 10/1983 | Allen | 307/471 |
| 4,547,863 | 10/1985 | Colardelle | 364/788 |
| 4,564,921 | 1/1986 | Suqanuma | 364/784 |
| 4,605,871 | 8/1986 | Price et al. | 307/471 |
| 4,621,338 | 11/1986 | Uhlenoff | 364/786 |
| 4,633,104 | 12/1986 | Mallinson | 307/471 |

FOREIGN PATENT DOCUMENTS 32992 10/1970 Japan .
211252 12/1983 Japan .

OTHER PUBLICATIONS

Application of Digital Signal Processing; The Institute of Electronics and Communications Engineers of Japan.

Primary Examiner—David H. Malzann
Assistant Examiner—Dale M. Shaw
Attorney, Agent, or Firm—Finnegan, Henderson, Farabow, Garrett & Dunner

[57] ABSTRACT

A logic operation circuit includes an exclusive-OR circuit for receiving first and second input signals, a carry output signal selection circuit for selectively generating a sum signal or an inverted signal thereof as a carry output signal in accordance with an output signal from the exclusive-OR circuit, and a carry output signal selection circuit for selectively generating a carry input signal or the first input signal as a sum signal in accordance with the output signal from the exclusive-OR circuit. The sum signal selection circuit has first and second differential amplifiers respectively driven by first and second output signals which are inverted to each other and received from the exclusive-OR circuit so as to generate the sum signal in accordance with the carry input signal, and the carry input signal selection circuit has third and fourth differential amplifiers respectively driven in accordance with the first and second output signals from the exclusive-OR circuit so as to generate carry output signals in accordance with the first input signal and carry input signal, respectively.

4 Claims, 6 Drawing Figures

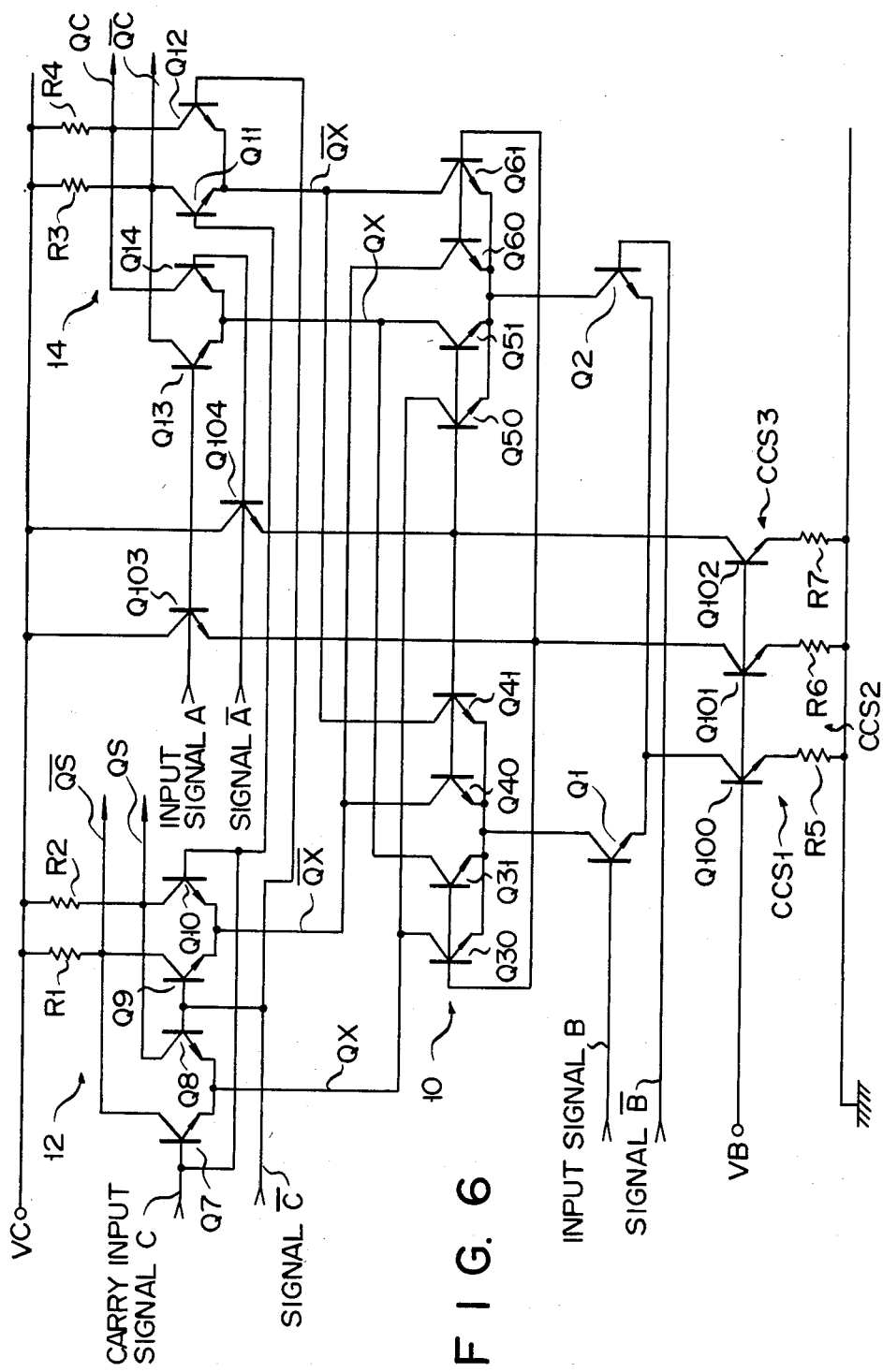
F I G. 6

LOGIC OPERATION CIRCUIT HAVING AN EXCLUSIVE-OR CIRCUIT

BACKGROUND OF THE INVENTION

The present invention relates to a logic operation circuit having a sum output terminal and a carry output terminal.

Conventionally, as shown in FIG. 1, a full adder circuit which generates sum signals S and $\bar{S}$ and carry output signals CO and $\overline{CO}$ in response to logic signals A and B and carry input signals C and $\bar{C}$ is known. The full adder circuit comprises transistors TR1 and TR2 having bases respectively connected to input terminals IT1 and IT2 for receiving the input signals A and B and collectors connected to a power source terminal VCC; transistors TR3 to TR8 having bases commonly connected to an input terminal IT3 for receiving the carry input signal C; and transistors TR9 to TR14 having bases commonly connected to an input terminal IT4 for receiving the carry input signal $\bar{C}$. The collectors of the transistors TR3, TR6, TR10 and TR11 are commonly connected to the base of a transistor TR15 and are also commonly connected to the terminal VCC through a resistor R1. The collectors of the transistors TR4, TR5, TR9 and TR12 are commonly connected to the base of a transistor TR16 and are also commonly connected to the terminal VCC through a resistor R2. The collectors of the transistors TR7 and TR8 are commonly connected to the base of a transistor TR17 and are also connected to the terminal VCC through a resistor R3. The collectors of the transistors TR13 and TR14 are commonly connected to the base of a transistor TR18 and are also commonly connected to the terminal VCC through a resistor R4.

The collectors of the transistors TR15 to TR18 are commonly connected to the terminal VCC, and the emitters thereof are respectively commonly connected to a power source terminal VEE through resistors.

Furthermore, the full adder circuit comprises transistors TR19 to TR22 having bases commonly connected to the emitter of the transistor TR1; transistors TR23 to TR26 having bases commonly connected to a reference voltage terminal VR1; transistors TR27 and TR28 having bases commonly connected to the emitter of the transistor TR2 through a diode D; transistors TR29 and TR30 having bases commonly connected to a reference voltage terminal VR2; and transistors TR31 and TR32 having bases commonly connected to a reference voltage terminal VR3. The collectors of the transistors TR19, TR20, TR22, TR23, TR24 and TR25 are respectively connected to the emitters of the transistors TR3 and TR9, the emitters of the transistors TR5 and TR11, the emitters of the transistors TR8 and TR14, the emitters of the transistors TR4 and TR10, the emitters of the transistors TR6 and TR12, and the emitters of the transistors TR7 and TR13. The collectors of the transistors TR21 and TR26 are connected to the terminal VCC respectively through the resistors R3 and R4. The collectors of the transistors TR27 to TR32 are respectively connected to the emitters of the transistors TR19 and TR23, the emitters of the transistors TR21 and TR25, the emitters of the transistors TR20 and TR24, the emitters of the transistors TR22 and TR26, the emitters of the transistors TR27 and TR29, and the emitters of the transistors TR28 and TR30.

In the full adder circuit, the sum signal S and its inverted signal $\bar{S}$ thereof and the carry output signal CO and its inverted signal $\overline{CO}$ are generated from the emitters of the transistors TR16, TR15, TR18 and TR17 in accordance with the input signals A, B, C and $\bar{C}$, respectively. Assume that the input signals A and B are at "1" level, and the carry input signals C and $\bar{C}$ are "0" and "1" levels. In this case, a current flows through the transistors TR9, TR19, TR27 and TR31, thereby rendering the transistors TR15 and TR16 conductive and nonconductive, respectively. Therefore, the "0" level sum signal S can be derived from the emitter of the transistor TR16. On the other hand, since the input signals A and B and the carry input signal $\bar{C}$ are "1" level, a current flows through the transistors TR21, TR28 and TR32, thus rendering the transistors TR18 and TR17 conductive and nonconductive, respectively. Therefore, the "1" level carry output signal CO can be derived from the emitter of the transistor TR18.

In the conventional full adder circuit, a circuit section for generating the sum signal and that for generating the carry signal are formed independently of each other. For this reason, the number of transistors required for constituting the full adder circuit is increased, and it is difficult to constitute an integrated circuit. Furthermore, in the full adder circuit, constant current sources TR31 and TR32 are separately used for the sum signal generating circuit section and the carry output signal generating section, resulting in an increase in the number of elements.

A conventional full adder circuit comprising CMOS transistors having a first exclusive-OR circuit for receiving logic input signals A and B; a second exclusive-OR circuit for receiving an output signal from the first exclusive-OR circuit and a carry input signal C so as to generate a sum signal SO; and a selection circuit for selecting the input signal B or the carry signal C in accordance with the output signal from the first exclusive-OR circuit so as to generate the selected signal as a carry output signal CO has been proposed. The configuration of the full adder circuit is based on a relationship among the input signals A and B, the carry input signal C, an exclusive-OR value of the signals A and B, the sum signal SO and the carry output signal CO. Unlike a conventional full adder circuit comprising CMOS transistors, the number of elements is decreased, and the circuit is suited for integration. However, in this full adder circuit, since a number of MOS transistors are used, the operating speed is low.

SUMMARY OF THE INVENTION

It is an object of the present invention to provide a simple logic operation circuit in which the number of elements is decreased.

In order to achieve the above object, there is provided a logic operation circuit comprising an exclusive-OR circuit for generating first and second output signals which are inverted to each other in accordance with first and second input signals; a sum signal selection circuit having first and second differential amplifier circuits which are driven by the first and second output signals from the exclusive-OR circuit so as to generate a sum signal in accordance with a carry input signal; and a carry output signal selection circuit including a third differential amplifier circuit driven by the first output signal from the exclusive-OR circuit to generate a carry output signal in accordance with the first input signal, and a fourth differential amplifier circuit driven in accordance with the second output signal from the exclusive-OR circuit to generate the carry output signal in accordance with the carry input signal.

In the logic operation circuit according to the present invention, the sum signal selection circuit comprises the first and second differential amplifier circuits driven by the output signal from the exclusive-OR circuit, and the carry output signal selection circuit comprises third and fourth differential amplifier circuits driven by the output signal from the exclusive-OR circuit. Therefore, the logic operation circuit can be formed with bipolar transistors with a simple structure.

BRIEF DESCRIPTION OF THE DRAWINGS

FIG. 6 is a circuit diagram of the logic operation circuit obtained by combining the circuits shown in FIGS. 3 to 5.

DETAILED DESCRIPTION OF THE PREFERRED EMBODIMENT

Figure 1:
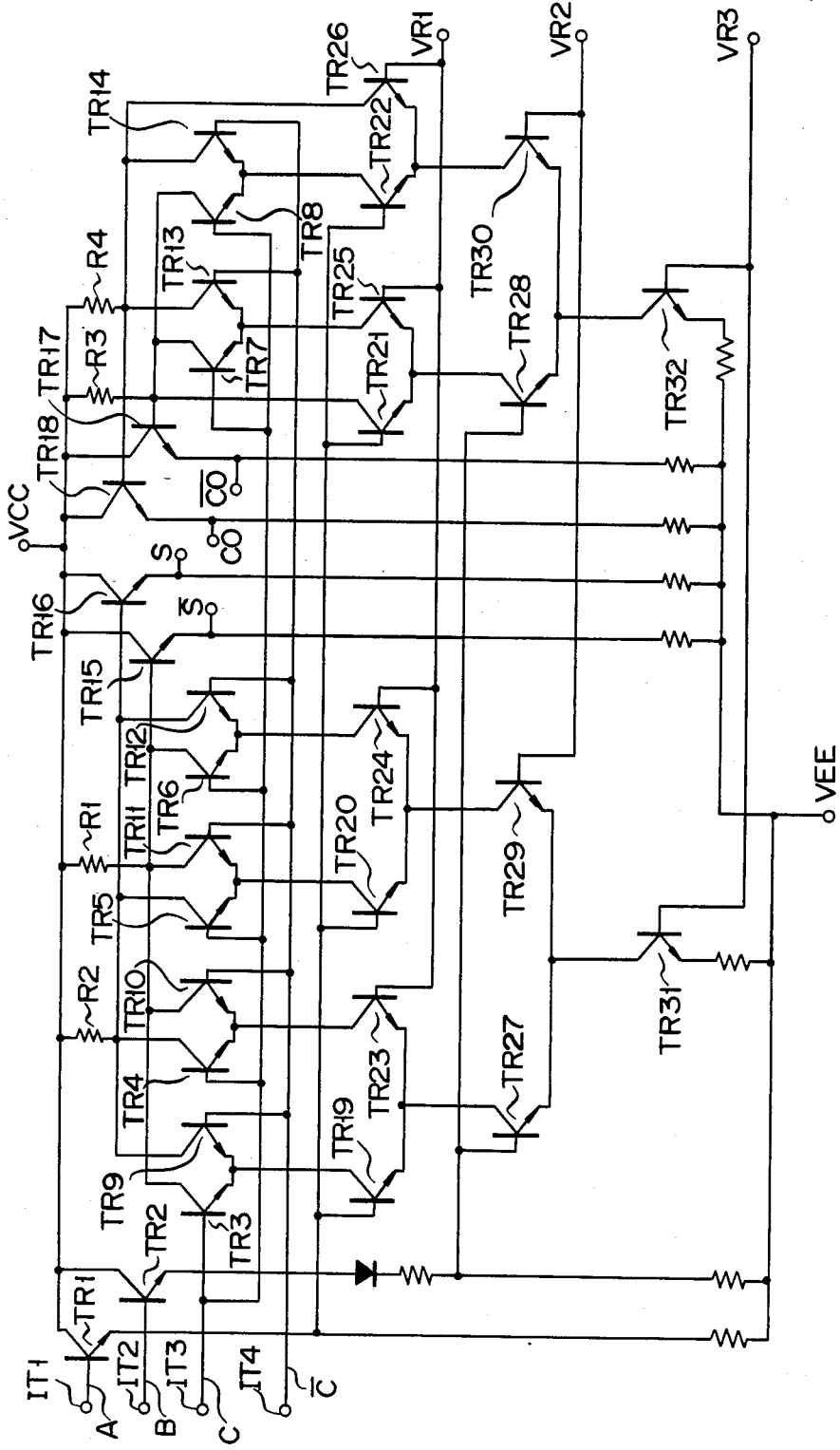
FIG. 1 is a circuit diagram of a conventional full adder circuit.
Figure 2:
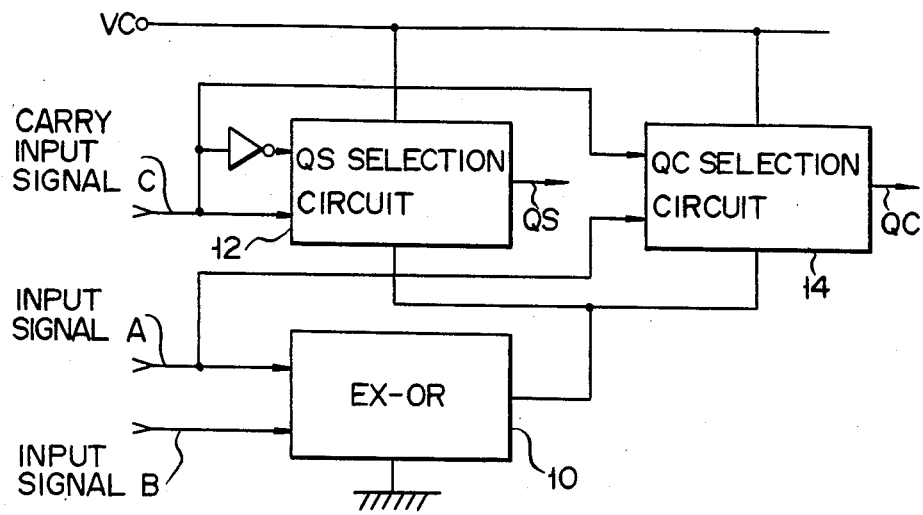
FIG. 2 is a diagram showing a logic operation circuit according to an embodiment of the present invention.

FIG. 2 is a diagram showing a logic operation circuit according to an embodiment of the present invention. The logic operation circuit is constructed by utilizing the relationship among input signals A and B, a carry input signal C, an output signal QX from an exclusive-OR circuit 10 which receives the input signals A and B, a sum output signal QS and a carry output signal QC. This logic operation circuit serves as a full adder circuit in accordance with a truth table shown below.

TABLE

| A | B | C | QS | QC | QX |
|---|---|---|---|---|---|
| 0 | 0 | 0 | 0 (= C) | 0 (= A) | 0 |
| 0 | 0 | 1 | 1 (= C) | 0 (= A) | 0 |
| 1 | 1 | 0 | 0 (= C) | 1 (= A) | 0 |
| 1 | 1 | 1 | 1 (= C) | 1 (= A) | 0 |
| 0 | 1 | 0 | 1 (= $\overline{C}$) | 0 (= C) | 1 |
| 0 | 1 | 1 | 0 (= $\overline{C}$) | 1 (= C) | 1 |
| 1 | 0 | 0 | 1 (= $\overline{C}$) | 0 (= C) | 1 |
| 1 | 0 | 1 | 0 (= $\overline{C}$) | 1 (= C) | 1 |

As can be seen from this truth table, when the output signal QX of the exclusive-OR circuit 10 is at "0" level, the sum signal QS is equal to the carry input signal C and the carry output signal QC is equal to the input signal A. When the output signal QX of the circuit 10 is at "1" level, the sum signal QS is equal to a signal $\overline{C}$ which is obtained by inverting the carry input signal C and the carry output signal QC is equal to the carry input signal C.

In the full adder circuit shown in FIG. 2, the output terminal of the circuit 10 is connected to the control terminals of a sum signal selection circuit 12 and a carry output signal selection circuit 14. The circuit 12 serves as a switching circuit having a first input terminal which directly receives the carry input signal C and a second input terminal which receives the carry input signal C through an inverter, and having an operation mode or switching position controlled by the output signal QX from the circuit 10. The circuit 12 is set in a first operation mode in response to the "0" output signal QX from the circuit 10 so as to generate the carry input signal C as a sum signal QS. The circuit is set in a second operation mode in response to the "1" output signal QX from the circuit 10 so as to generate as the sum signal QS a signal $\overline{C}$ obtained by inverting the carry input signal C. The circuit 14 serves as a switching circuit having a first input terminal which receives the input signal A and a second input terminal which receives the carry input signal C, and having an operation mode or switching position controlled by the output signal QX from the circuit 10. The circuit 14 is set in a first operation mode in response to the "0" output signal QX from the circuit 10 so as to generate the input signal A as the carry output signal QC, and is set in a second operation mode in response to the "1" output signal QX from the circuit 10 so as to generate the carry input signal C as the carry output signal QC. These circuits 10, 12 and 14 are driven by a power supply voltage VC.

Figure 3:
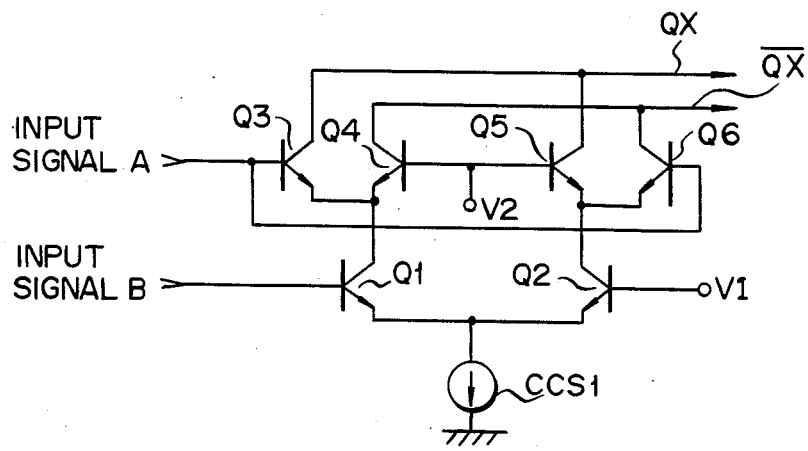
FIG. 3 is a detailed circuit diagram of an exclusive-OR circuit shown in FIG. 2.

FIG. 3 shows a basic circuit configuration of the exclusive-OR circuit 10 shown in FIG. 2. The circuit 10 includes a balance type differential amplifier circuit including npn transistors Q1 to Q6 and a constant current source CCS1. In the differential amplifier circuit, the emitters of the transistors Q1 and Q2 are grounded through the current source CCS1, the emitters of the transistors Q3 and Q4 are commonly connected to the collector of the transistor Q1, and the emitters of the transistors Q5 and Q6 are commonly connected to the collector of the transistor Q2. The input signal B is supplied to the base of the transistor Q1, and a voltage V1 having an intermediate level between HIGH and LOW levels of the input signal B is applied to the base of the transistor Q2. The input signal A is supplied to the bases of the transistors Q3 and Q6, and a voltage V2 having an intermediate level between the HIGH and LOW levels of the input signal A is applied to the bases of the transistors Q4 and Q5. Instead of the voltage V1, an inverted input signal $\overline{B}$ can be supplied to the base of the transistor Q2, and instead of the voltage V2, an inverted input signal $\overline{A}$ can be supplied to the bases of the transistors Q4 and Q5. The collectors of the transistors Q3 and Q5 are connected to a QX output line, and the collectors of the transistors Q4 and Q6 are connected to a $\overline{QX}$ line.

For example, when the input signals A and B are respectively at "1" and "0" levels, since the transistors Q6 and Q2 are turned on, a collector potential of the transistor Q6 is at "0" level. Therefore, the output signals of "1" and "0" levels appear on the QX and $\overline{QX}$ lines, respectively.

Figure 4:
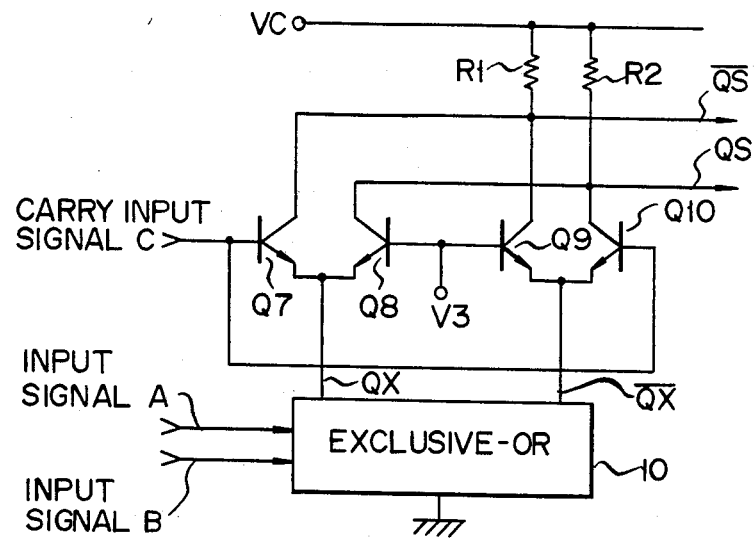
FIG. 4 is a detailed circuit diagram of a sum signal selection circuit shown in FIG. 2.

FIG. 4 shows a circuit configuration of the sum signal selection circuit 12. The circuit 12 comprises npn transistors Q7 and Q8 constituting a differential amplifier, npn transistors Q9 and Q10 constituting a differential amplifier, and load resistors R1 and R2. The emitters of the transistors Q7 and Q8 are connected to the QX output line of the circuit 10, and the emitters of the transistors Q9 and Q10 are connected to the $\overline{QX}$ output line thereof. The carry input signal C is supplied to the bases of the transistors Q7 and Q10, and a voltage V3 having an intermediate level between the HIGH and LOW levels of the carry input signal C is applied to the bases of the transistors Q8 and Q9. The inverted carry input signal $\overline{C}$ can be supplied to the bases of the transistors Q8 and Q9 instead of the voltage V3. The collectors of the transistors Q7 and Q9 are connected to a $\overline{QS0}$ output line and are connected to a power source terminal VC through the resistor R1. The collectors of the transistors Q8 and Q10 are connected to a QS output line and are connected to the terminal VC through the resistor R2. The sum signal QS is generated from the collector of the transistor Q8 or Q10 through the QS output line, and the inverted sum signal $\overline{QS}$ is generated from the collector of the transistor Q7 or Q9 through the $\overline{QS}$ output line.

The circuit 12 generates the sum signal QS in accordance with the output signals QX and $\overline{QX}$ from the circuit 10 and the carry input signal C so as to satisfy the relation between the signals QS, QX and C shown in the truth table described previously. When the signals QX and $\overline{QX}$ are respectively at "1" and "0" levels or at "0" and "1" levels, the "1" level sum signal QS is generated, and in other cases, the "0" level sum signal QS is generated.

Figure 5:
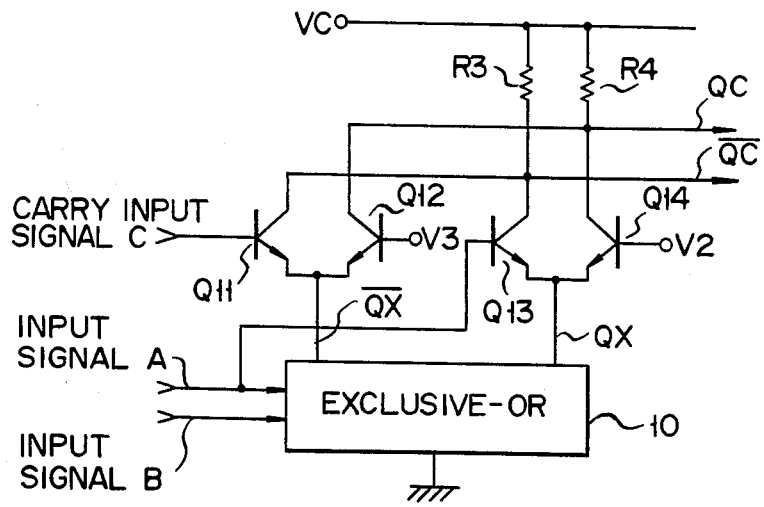
FIG. 5 is a detailed circuit diagram of a carry output signal selection circuit shown in FIG. 2.

FIG. 5 shows a circuit configuration of the carry output signal selection circuit 14. The circuit 14 comprises npn transistors Q11 and Q12 constituting a differential amplifier, npn transistors Q13 and Q14 constituting a differential amplifier, and resistors R3 and R4. The emitters of the transistors Q11 and Q12 are connected to the $\overline{QX}$ output line of the circuit 10, and the emitters of the transistors Q13 and Q14 are connected to the QX output line thereof. The carry input signal C and the input signal A are supplied to the bases of the transistors Q11 and Q13, respectively, and the voltages V3 and V2 are respectively applied to the bases of the transistors Q12 and Q14. Instead of the voltages V3 and V2, the inverted signals $\overline{C}$ and $\overline{A}$ can be supplied to the bases of the transistors Q12 and Q14, respectively. The collectors of the transistors Q11 and Q13 are connected to a $\overline{QC}$ output line and are connected to the power source terminal VC through the resistor R3. The collectors of the transistors Q12 and Q14 are connected to a QC output line and are connected to the terminal VC through the resistor R4. The carry output signal QC is generated from the collectors of the transistors Q12 and Q14 through the QC output line, and the inverted carry output signal $\overline{QC}$ is generated from the collectors of the transistors Q11 and Q13 through the $\overline{QC}$ output line.

The circuit 14 generates the carry output signal QC in accordance with the output signals QX and $\overline{QX}$ from the circuit 10, the carry input signal C and the input signal A, so as to satisfy the relation between these signals as shown in the truth table. That is, when both the signals QX and A are at "0" level, or when the signals QX and C are respectively "1" and "0" levels, the "0" level carry output signal QC is generated, and in other cases, the "1" level carry output signal QC is generated.

FIG. 6 shows a logic operation circuit constituted in accordance with the circuits 10, 12 and 14. Note that in this circuit, transistors Q30 and Q31 are used instead of the transistor Q3 of the circuit 10, transistors Q40 and Q41 are used instead of the transistor Q4, transistors Q50 and Q51 are used instead of the transistor Q5, and transistors Q60 and Q61 are used instead of the transistor Q6. The collectors of the transistors Q30 and Q50 are commonly connected to the emitters of the transistors Q7 and Q8, the collectors of the transistors Q40 and Q60 are commonly connected to the emitters of the transistors Q9 and Q10, the collectors of the transistors Q31 and Q51 are commonly connected to the emitters of the transistors Q11 and Q12, and the collectors of the transistors Q41 and Q61 are commonly connected to the emitters of the transistors Q13 and Q14. In this circuit, the constant current source CCS1 is constituted by an npn transistor Q100 whose collector is connected to the emitters of the transistors Q1 and Q2, whose emitter is grounded through a resistor R5, and whose base is connected to receive a voltage VB. Furthermore, the circuit shown in FIG. 6 includes a constant current source CCS2 constituted by an npn transistor Q101 and a resistor R6, and a constant current source CCS3 constituted by an npn transistor Q102 and a resistor R7 in the same manner as in the current source CCS1. The collector of the transistor Q101 is connected to the terminal VC through an npn transistor Q103 whose base is connected to receive the signal A. The collector of the transistor Q102 is connected to the terminal VC through an npn transistor Q104 whose base is connected to receive the signal $\overline{A}$.

Assume that the input signals A and B are at "1" level and the carry input signal C is at "0" level. In this case, the transistors Q1, Q30, Q31, Q8, Q13 and Q103 are turned on. Therefore, an operating current flows through the transistors Q103 and Q101, and a current flows through the transistors Q8, Q30, Q1 and Q100 and through the transistors Q13, Q31, Q1 and Q100. Thus, the sum signal QS of "0" level is generated from the circuit 12, and the carry output signal of "1" level is generated from the circuit 14. In this manner, when the input signals A and B of "1" level and the carry input signal of "0" level are supplied to the logic operation circuit, the sum signal QS of "0" level and the carry output signal QC of "1" level are generated therefrom. The logic operation circuit generates the sum signal QS and the carry output signal QC with respect to various combinations of the input signals A, B and C so as to satisfy the relation shown in the truth table described previously.

The logic operation circuit described above the fewer elements and a simpler arrangement than a conventional one.

What is claimed is:

1. A logic operation circuit comprising:
    an exclusive-OR circuit for generating first and second output signals which are inverted to each other in accordance with first and second input signal;
    a sum signal selection circuit having first and second differential amplifier circuits which each include a plurality of transistors having emitter-collector paths connected between a power source terminal and the output terminals of said exclusive OR circuit and are driven by the first and second output signals from said exclusive-OR circuit to generate a sum signal in accordance with a carry input signal; and
    a carry output signal selection circuit including a third differential amplifier circuit driven by the first output signal from said exclusive-OR circuit to generate a carry output signal in accordance with the first input signal, and a fourth differential amplifier circuit driven in accordance with the second output signal from said exclusive-OR circuit to generate the carry output signal in accordance with the carry input signal, each of said third and fourth differential amplifier circuits including a plurality of transistors having emitter-collector paths connected between the power source terminal and the output terminals of said exclusive-OR circuit.

2. A circuit according to claim 1, wherein said exclusive-OR circuit comprises a fifth differential amplifier circuit driven by first constant current source to generate output signals which are inverted to each other from first and second output terminals thereof in accordance with the second input signal, a sixth differential amplifier circuit driven in accordance with the output signal from the first output terminal of said fifth differential amplifier circuit to generate first and second output signals from first and second output terminals thereof in accordance with the first input signal, and a seventh differential amplifier circuit driven in accordance with the output signal from the second output terminal of said fifth differential amplifier to generate first and second output signals from first and second output terminals thereof, respectively connected to the first and second output terminals of said sixth differential amplifier circuit, in accordance with the first input signal.

3. A circuit according to claim 2, wherein said sixth differential amplifier circuit comprises a first differential amplifier having first and second output terminals respectively connected to said first and second differential amplifier circuits and a second differential amplifier having first and second output terminals respectively connected to said third and fourth differential amplifier circuits, and said seventh differential amplifier circuit comprises a third differential amplifier having first and second output terminals respectively connected to said first and second differential amplifier circuits and a fourth differential amplifier having first and second output terminals respectively connected to said third and fourth differential amplifier circuits.

4. A circuit according to claim 2, wherein said fifth differential amplifier circuit includes first and second transistors having emitters commonly connected to said first constant current source, said first differential amplifier includes third and fourth transistors having emitters commonly connected to the collector of said first transistor and collectors respectively connected to said first and second differential amplifier circuits, said second differential amplifier includes fifth and sixth transistors having emitters commonly connected to the collector of said first transistor and collectors respectively connected to said third and fourth differential amplifier circuits, said third differential amplifier includes seventh and eighth transistors having emitters commonly connected to the collector of said second transistor and collectors respectively connected to said first and second differential amplifier circuits, and said fourth differential amplifier includes ninth and tenth transistors having emitters commonly connected to the collector of said second transistor and collectors respectively connected to said third and fourth differential amplifier circuits.

* * * * *